Patented Dec. 26, 1950

2,535,174

UNITED STATES PATENT OFFICE 2,535,174

MERCAPTOETHANEPHOSPHONATES

Pliny O. Tawney, Passaic, N. J., assignor to United States Rubber Company, New York, N. Y., a corporation of New Jersey No Drawing. Application April 7, 1949, Serial No. 86,109

9 Claims. (Cl. 260—461)

This invention relates to certain new organophosphorus compounds and to a method of preparing them. More particularly, the invention relates to compounds resulting from the alkaline catalyzed addition of saturated aliphatic mercaptans to esters of ethenephosphonic acid.

It is an object of my invention to provide new and useful organo-phosphorus compounds. Another object is to provide a method for the synthesis of such compounds.

The compounds obtained from the practice of my invention are useful as intermediates in the synthesis of other chemicals, and as plasticizers, insecticides, heat transfer agents, lubricants, hydraulic fluids and textile-treating materials.

I have now discovered that saturated aliphatic mercaptans will undergo addition reaction with ethylenically unsaturated compounds in which the ethylenic group is in conjugated relationship to the group

It has not heretofore been known that ethenephosphonic acid esters would react in this way with mercaptans.

Specifically, I have discovered that saturated aliphatic mercaptans will react with dialkyl esters of ethenephosphonic acid to give a series of new and useful organo-phosphorus compounds. The reaction may be illustrated by the following equation:

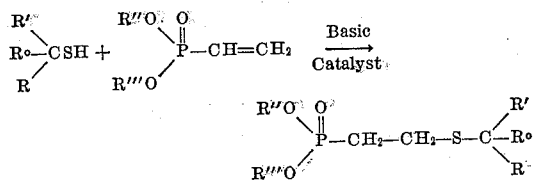

wherein R, R° and R' are selected from the class consisting of hydrogen and alkyl groups, and R'' and R''' are alkyl groups.

The addition reaction of my invention is most advantageously carried out by heating the reactants in the presence of a basic catalyst to an elevated temperature which may conveniently range from 65° C. to 150° C. The reaction may be conducted by heating the reactants at the boiling point under reflux when the boiling point of the mixture is not so high as to cause excessive decomposition.

Any saturated aliphatic monohydric mercaptan may be used in the practice of my invention. Examples are methyl, ethyl, n-propyl, isopropyl, n-butyl, sec-butyl, tertiary-butyl mercaptans and the primary, secondary, and tertiary amyl, hexyl, heptyl, octyl, nonyl, decyl, dodecyl, and higher mercaptans. Usually the mercaptan will contain from one to twenty carbon atoms per molecule. In the case of the lower-boiling mercaptans, and particularly in the case of methyl mercaptan and ethyl mercaptan, it will usually be preferable and in fact necessary to carry out the reaction under pressure in order to keep the mercaptan in the liquid phase.

Any dialkyl ester of ethenephosphonic acid may be used in the practice of my invention. The alkyl groups therein may be the same or different. Examples of alkyl groups include methyl, ethyl, propyl, butyl, amyl, hexyl, heptyl, octyl, etc.

It is preferred to have present either an excess of the mercaptan or a suitable added inert diluent (e. g., benzene) in the reaction mixture in order to keep the reaction mixture fluid during the reaction. It is often preferred to use an excess of the mercaptan itself to serve as the diluent. In any case it is preferred to use an amount of the mercaptan at least equal to that amount which is stoichiometrically equivalent to the dialkyl ester of ethenephosphonic acid. This insures complete utilization of the relatively expensive ethenephosphonic ester reactant.

The preferred catalyst is an alkali metal mercaptide of the mercaptan used as a reactant. This catalyst is most conveniently made by dissolving the alkali metal in a suitable excess of the mercaptan, the resulting solution being used directly in the reaction. Sodium metal is preferred for this purpose. However, other alkali metals such as potassium, lithium, etc., may be used.

Less preferably other basic materials may be used as catalysts in carrying out the addition reaction of the present invention. Examples include oxides and hydroxides of alkali metals; oxides, hydroxides and mercaptides of alkaline earth metals; such as those of calcium, barium, strontium, etc.; and organic bases, e. g., amines such as pyridine, piperidine, and various quaternary ammonium hydroxides such as benzyltrimethylammonium hydroxide, etc.

The amount of catalyst required to effect the reaction is very small, commonly ranging from 0.01 mole to 0.2 mole per mole of the dialkyl ester of ethenephosphonic acid.

The reaction is preferably carried out under substantially anhydrous conditions which are easily attained by the use of anhydrous reactants and by carrying out the reaction in such a manner that access of extraneous moisture is prevented.

The reaction is preferably conducted until the diethyl ethenephosphonate has been substantially completely combined. The duration of the reaction may vary widely. Following the attainment of the desired completeness of reaction, the addition reaction product is recovered from the reaction mixture in any suitable manner. In the case of the lower-boiling products, their recovery may conveniently be effected by distillation.

The following examples disclose my invention in more detail. All parts are by weight.

*Example 1*

To a solution of 0.05 part of sodium in 20.9 parts of dodecyl mercaptan, 18.0 parts of diethyl ethenephosphonate are added. The solution is heated for 24 hours at a temperature of 100° C. and is then distilled to obtain 21.0 parts of diethyl 2-dodecylmercaptoethanephosphonate, B. P., 200–203° C./0.3 mm.

| Analysis | C | H | S | P |
|---|---|---|---|---|
| Found (1) | 61.34 | 11.44 | 8.68 | 7.76 |
| Found (2) | 59.98 | 10.83 | | 8.03 |
| Theory | 59.00 | 10.65 | 8.75 | 8.48 |

*Example 2*

To a solution of 0.1 part [1] of sodium in 27 parts [2] of tertiary butyl mercaptan, 25.0 parts of diethyl ethenephosphonate are added. The solution is allowed to stand at room temperature for 16 hours and is heated under reflux for an additional four hours. It is then distilled to remove excess mercaptan and to obtain 33.1 parts of diethyl 2-tertiary butylmercaptoethanephosphonate, B. P., 97–98° C./1 mm., $N_D^{20}$=1.4612.

| Analysis | P | S |
|---|---|---|
| Found | 12.28 | 12.22 |
| Theory | 12.21 | 12.60 |

Having thus described my invention, what I claim and desire to protect by Letters Patent is:

1. The process which comprises effecting heating a mixture of a saturated aliphatic mercaptan, a dialkyl ester of ethenephosphonic acid and a basic catalyst and thereby forming a compound having the formula $$\begin{array}{c}R''O\\R'''O\end{array}\!\!\!\!>\!\!\overset{O}{\underset{\|}{P}}\!-\!CH_2\!-\!CH_2\!-\!S\!-\!\underset{R}{\overset{R'}{C}}\!\!-\!R^o$$

where R, R° and R' are selected from the group consisting of hydrogen and alkyl groups, and R'' and R''' are alkyl groups.

2. The process which comprises heating a mixture of a saturated aliphatic mercaptan, a dialkyl ester of ethenephosphonic acid and an alkali metal salt of said mercaptan as a catalyst and thereby forming a compound having the formula $$\begin{array}{c}R''O\\R'''O\end{array}\!\!\!\!>\!\!\overset{O}{\underset{\|}{P}}\!-\!CH_2\!-\!CH_2\!-\!S\!-\!\underset{R}{\overset{R'}{C}}\!\!-\!R^o$$

where R, R° and R' are selected from the group consisting of hydrogen and alkyl groups, and R'' and R''' are alkyl groups.

3. The process which comprises effecting heating a mixture of dodecyl mercaptan, diethyl ethenephosphonate and a basic catalyst and thereby forming a compound having the formula $$\begin{array}{c}EtO\\EtO\end{array}\!\!\!\!>\!\!\overset{O}{\underset{\|}{P}}\!-\!CH_2\!-\!CH_2\!-\!S\!-\!C_{12}H_{25}$$

4. The process which comprises heating a mixture of dodecyl mercaptan, diethyl ethenephosphonate and an alkali metal salt of said mercaptan as a catalyst and thereby forming a compound having the formula $$\begin{array}{c}EtO\\EtO\end{array}\!\!\!\!>\!\!\overset{O}{\underset{\|}{P}}\!-\!CH_2\!-\!CH_2\!-\!S\!-\!C_{12}H_{25}$$

5. The process which comprises effecting heating a mixture of tertiary butyl mercaptan, diethyl ethenephosphonate and a basic catalyst and thereby forming a compound having the formula $$\begin{array}{c}EtO\\EtO\end{array}\!\!\!\!>\!\!\overset{O}{\underset{\|}{P}}\!-\!CH_2\!-\!CH_2\!-\!S\!-\!\underset{CH_3}{\overset{CH_3}{C}}\!\!-\!CH_3$$

6. The process which comprises heating a mixture of tertiary butyl mercaptan, diethyl ethenephosphonate and an alkali metal salt of said mercaptan as a catalyst and thereby forming a compound having the formula $$\begin{array}{c}EtO\\EtO\end{array}\!\!\!\!>\!\!\overset{O}{\underset{\|}{P}}\!-\!CH_2\!-\!CH_2\!-\!S\!-\!\underset{CH_3}{\overset{CH_3}{C}}\!\!-\!CH_3$$

7. New chemical compounds having the formula $$\begin{array}{c}R''O\\R'''O\end{array}\!\!\!\!>\!\!\overset{O}{\underset{\|}{P}}\!-\!CH_2\!-\!CH_2\!-\!S\!-\!\underset{R}{\overset{R'}{C}}\!\!-\!R^o$$

where R, R° and R' are selected from the group consisting of hydrogen and alkyl groups, and R'' and R''' are alkyl groups.

8. A new chemical compound having the formula $$\begin{array}{c}EtO\\EtO\end{array}\!\!\!\!>\!\!\overset{O}{\underset{\|}{P}}\!-\!CH_2\!-\!CH_2\!-\!S\!-\!C_{12}H_{25}$$

9. A new chemical compound having the formula $$\begin{array}{c}EtO\\EtO\end{array}\!\!\!\!>\!\!\overset{O}{\underset{\|}{P}}\!-\!CH_2\!-\!CH_2\!-\!S\!-\!\underset{CH_3}{\overset{CH_3}{C}}\!\!-\!CH_3$$

PLINY O. TAWNEY.

No references cited.

---

[1] Sodium was not weighed, 0.1 an arbitrary figure.
[2] 30 cc. mercaptan used. Sp. gr. not known, estimated at 0.9.